Oct. 28, 1924. 1,513,399
W. J. KNOX
SIX-WHEEL TRUCK
Filed June 26, 1922
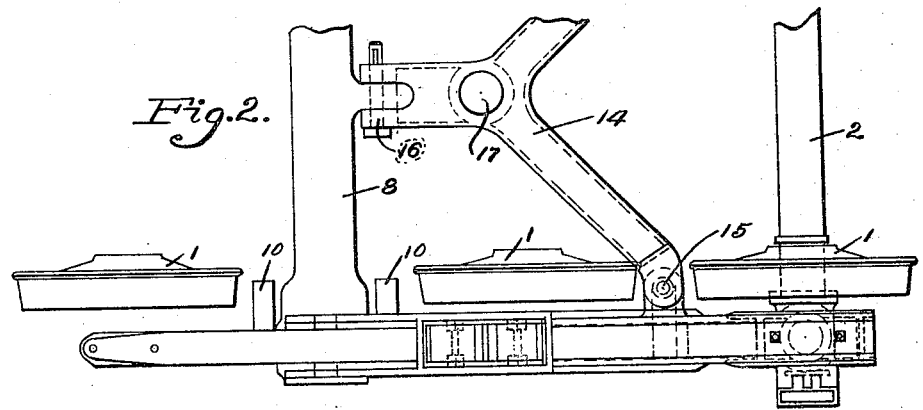
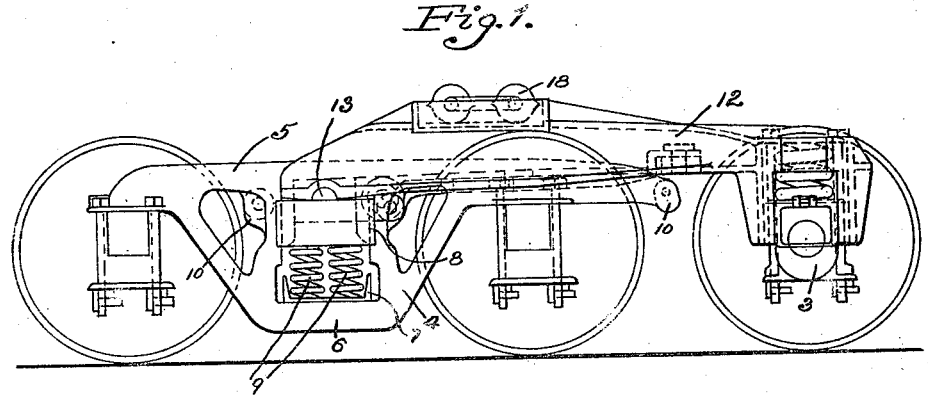
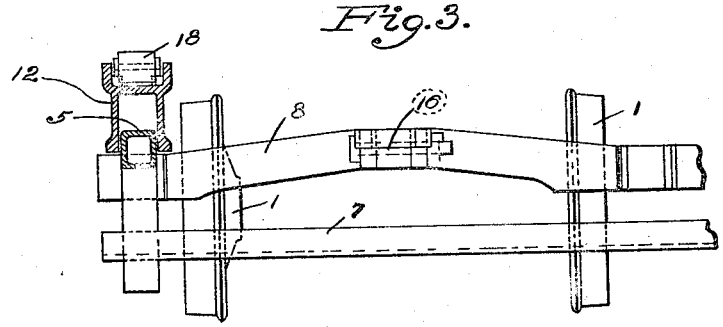
Inventor
William J. Knox
By F. R. Cornwall Atty.

Patented Oct. 28, 1924.

1,513,399

UNITED STATES PATENT OFFICE.

WILLIAM J. KNOX, OF DUBOIS, PENNSYLVANIA.

SIX-WHEEL TRUCK.

Application filed June 26, 1922. Serial No. 570,974.

*To all whom it may concern:*

Be it known that I, WILLIAM J. KNOX, a citizen of the United States, residing at Dubois, county of Clearfield, and State of Pennsylvania, have invented a certain new and useful Improvement in Six-Wheel Trucks, of which the following is a full, clear, and exact description, such as will enable others skilled in the art to which it appertains to make and use the same, reference being had to the accompanying drawings, forming part of this application.

My invention relates to railroad rolling stock and consists in an improved six wheel truck, especially adapted for freight equipment.

The objects of my invention are to provide an articulated truck possessing such flexibility as will enable it to readily travel around curves and over uneven track and which is adapted to support the car body at the sides of the latter exclusively.

In the accompanying drawings, illustrating a selected embodiment of my invention,—

Figure 1 is a side elevation of my truck with the brake rigging and other incidental equipment omitted.

Figure 2 is a partial top view of the truck.

Figure 3 is an end view of the truck with the body supporting member sectioned at its point of support.

The truck wheels 1 are mounted on the ordinary axles 2 provided with journal boxes 3. Four of the truck wheels, two on each side, carry side frames 4, each of which is shown as being cast in one piece, comprising an upper portion 5 of box-section and a lower portion 6, said portions being separated by a substantial opening which provides for the passage through the frame of a spring plank 7, and a floating transom 8 yieldingly supported on the spring plank by coil springs 9.

The frames 4 are preferably provided with integral brake hanger lugs 10. The journal box of the other wheel on each side of the truck yieldingly supports one end of an arch 12 which extends lengthwise over the upper member 5 of side frame 4 and, being channel-shaped, is adapted to straddle member 5, enabling the other end of the arch to be pivotally supported at 13 upon the outer end of transom 8.

A second transom or spreader member 14 is pivoted at 15 to the arches 12 and is substantially V-shaped, its apex extending inwardly toward transom 8 and assembled therewith by a pivotal connection 16. Pivots 15 are disposed in a vertical plane and pivots 16 in a horizontal plane, this assembly providing the two-wheel portion of the truck with the desired degree of movement relative to the four-wheel portion of the truck.

Transom 14 is provided with a king pin bearing 17 which is adapted to provide means for centering the body of the car to be mounted on the truck, but is not intended to support the latter. The car body is entirely supported at its sides by roller or rocker bearings 18 mounted in suitable recesses upon the upper faces of arches 12. These bearings are disposed lengthwise of the arches in such manner that the car weight is distributed equally on the wheels.

In the construction shown, the horizontal distance from the arch bearing 13 to the center of the body bearings is one-third of the distance from arch bearing 13 to the center of the axle of the right hand wheel on the truck. This distributes two-thirds of the load carried by arch 12 to the center of the four wheel truck, one-half of this load or one-third of the entire load on the arch being distributed to each of the two wheels on the one side of the truck by transom 8 and side frame 4, the other third of the arch load being distributed directly to the third wheel on the same side of the truck.

With trucks of this type, the car body is carried at four points, these points resting on rollers on rockers located in the sides of the trucks and the body load is equally distributed to all of the truck axles. The transom 8 with spring plank 7 serves as a cross tie for the truck frame and transfers the load on arches 12 to the two springs 9, but is not provided with a center plate. Transom 14 similarly serves as a cross tie for arches 12, links the two portions of the truck together, and serves to center the car body, but, like transom 8, does not have a center plate and does not carry any portion of the load.

I contemplate any modifications of my invention which are included within the scope of the following claims.

What I claim is:

1. In an articulated truck, side frames carried by one truck, a transom carried by said side frames, members carried by said transom and the other truck, and a transom pivotally connected to said members and to said first-mentioned transom.

2. In an articulated truck, a truck having side frames, a transom carried thereby, a second truck, arches each aligned with one of said side frames and supported on the same and on said second truck and provided with an inwardly extending clevis having horizontal jaws, a transom having tongues at its ends pivoted in said jaws and between its ends having a forward projection pivoted to said first-mentioned transom.

3. In a six wheel truck, side frames carried by four wheels of the truck, a transom yieldingly mounted on said frames, arches carried by said transom and the other two wheels of the truck and a one-piece V-shaped transom having the ends of its legs carried by said arches and its apex carried by said first-mentioned transom.

4. In an articulated six wheel truck, side frames carried by four wheels of the truck, a transom yieldingly mounted on said frames, arches carried by said transom and the other two wheels of the truck, a transom pivotally connected to said arches and to said first-mentioned transom and provided with a king pin bearing.

5. In an articulated six wheel truck, side frames carried by four wheels of the truck, a transom yieldingly mounted on said frames, arches carried by said transom and the other two wheels of the truck, a transom pivoted to said arches in a vertical plane and to said first-mentioned transom in a horizontal plane and provided with a king pin bearing.

6. A six wheel truck comprising two axles, side frames mounted thereon, a transom supported on and spacing said side frames, a third axle, arches supported on said transom and said axle, a second transom spacing said arches and united to said first-mentioned transom at the center thereof, and bearings for the car body on said arches.

7. In a truck, wheels, axles, and journal boxes for same, side frames each supported at spaced points on two adjacent journal boxes on one side of the truck, arches each yieldingly supported at one end on the third journal box on one side of the truck, and at its other end yieldingly supported on one of said frames, bearings for the car body on said arches and means pivotally connected to said arches and to said frames to brace the sides of the truck.

8. In a truck, wheels, axles, and journal boxes for same, side frames each supported at spaced points on two adjacent journal boxes on one side of the truck, arches each yieldingly supported at one end on the third journal box on one side of the truck, and at its other end yieldingly supported on one of said frames at a point midway between the supports of the latter, and a bearing for the car body on each arch at a point half as far from its frame-supported-end as from its journal-box-supported end and a member provided with a king pin bearing and pivotally connected to said arches and side frames.

9. In a six wheel truck, side frames mounted on two wheels on each side of the truck and connected by a transom, arches from each of said side frames to the third wheel on the respective sides of the truck, and connected by a transom, said transoms being pivotally connected together intermediate their ends.

10. In a six wheel truck, side frames mounted on two wheels on each side of the truck and connected by a transom, respective arches from each of said side frames to the third wheel on the respective sides of the truck and pivotally connected by a V-shaped transom, the apex of said arch connecting transom being connected to the middle of said frame transom so as to have pivotal movement thereon in a vertical plane only, a center pin bearing in one of said transoms, and car body supports on said arches only.

11. In an articulated truck, a truck having side frames, a transom carried thereby, a second truck, arches carried by said transom and said second truck, and a transom pivoted to said arches and to said first mentioned transom.

12. In a six wheel truck, side frames supported on four of the wheels and each including a longitudinal upper member, a spring plank carried by said frames, springs mounted thereon, a transom extending through said frames beneath said members and supported on said springs, and body supporting arches each supported at one end on one of the other two wheels and at its other end straddling said member and supported on said transom.

13. In a six wheel truck, side frames mounted on four of the truck wheels, and car body supporting members each yieldingly supported by one of the remaining two wheels and by a transom carried by said frames, and having a pocket in its upper face provided with roller bearings adapted to support the car body at its sides only.

14. In an articulated car truck construction, a plurality of trucks and car body positioning means jointly carried by said trucks and free to pivot vertically in respect to one of said trucks and to pivot horizontally in respect to another of said trucks.

15. In an articulated car construction, a plurality of trucks, separate car body supporting members each jointly carried by said trucks, and a rigid connection for said members pivotally connected thereto and pivotally connected to one of said trucks.

16. In an articulated car construction, a truck having a spring supported transom, a second truck having a V-shaped spring supported transom, the apex of said V-shaped transom being pivotally connected to said first-mentioned transom.

In testimony whereof I hereunto affix my signature this fifth day of May, 1922.

WM. J. KNOX.